Feb. 21, 1967
K. B. TILLMANNS ET AL
3,305,705
MODULE SUPPORT STRUCTURE
Filed Sept. 3, 1964
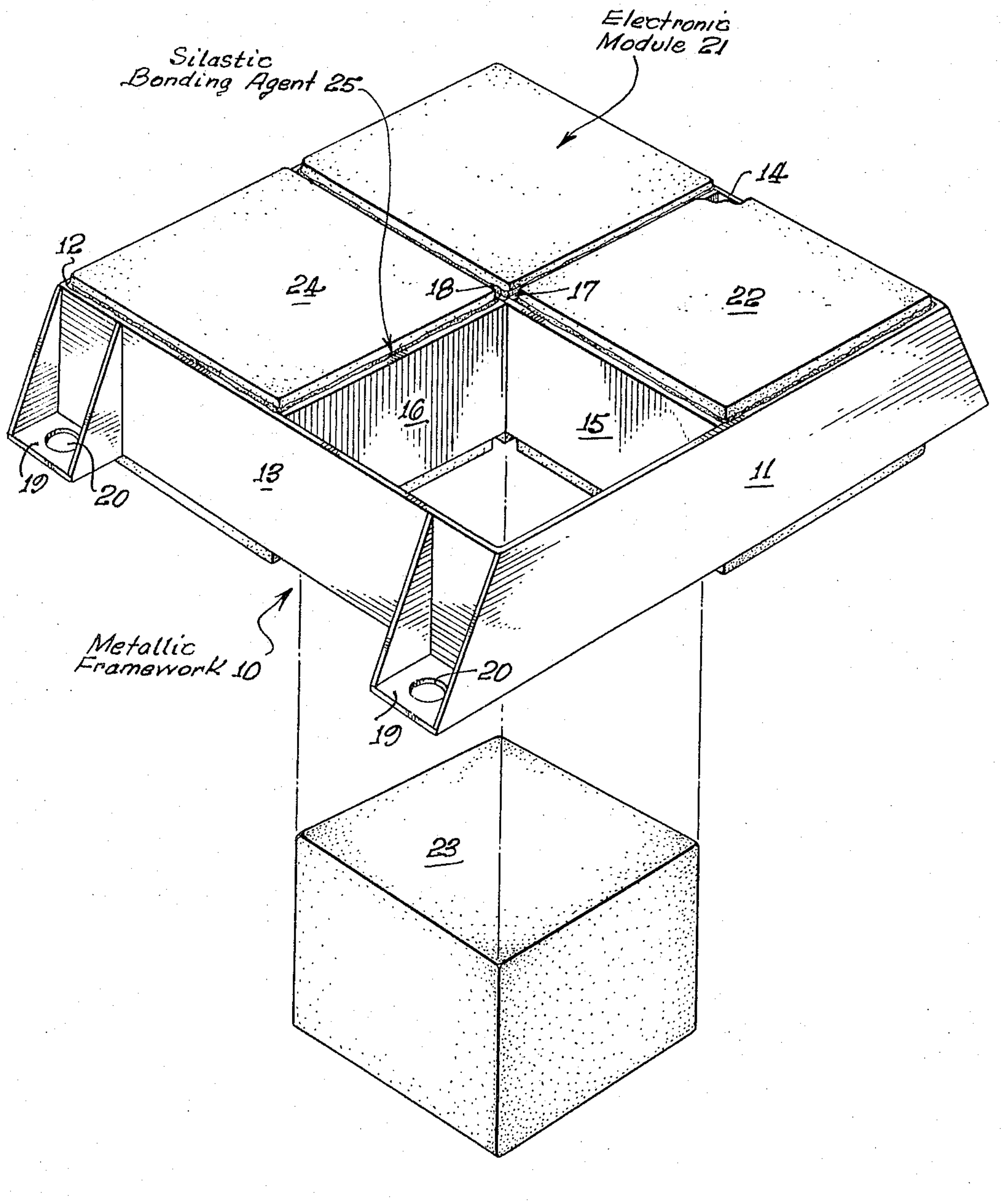
INVENTORS
KENNETH B. TILLMANNS,
DAVID E. PENNIMAN,
By [signature]
ATTORNEY.

United States Patent Office 3,305,705

Patented Feb. 21, 1967

3,305,705

MODULE SUPPORT STRUCTURE

Kenneth B. Tillmanns, Claremont, and David E. Penniman, Yorba Linda, Calif., assignors to General Dynamics Corporation, Pomona, Calif., a corporation of Delaware Filed Sept. 3, 1964, Ser. No. 394,123
9 Claims. (Cl. 317—100)

This invention relates to support structures, particularly to support structures for electronic modules, and more particularly to electronic module support structures wherein the modules are secured to the structure so as to provide accessibility for removal of one or more modules therefrom.

An object of this invention is to provide a structure for functional electronic modules in which the modules themselves become an integral part of the structure and yet remain replaceable.

A further object of the invention is to provide a structure for electronic modules which has a framework which fits between the modules in the same space required in conventional designs for clearance between modules.

Another object of the invention is to provide a support structure for elements wherein the elements are bonded to the structure.

Another object of the invention is to provide a support structure for modules which allows for increased electrical interconnection capability between modules since the modules protrude from two sides of the framework and both sides may be used for interconnections.

Another object of the invention is to provide a support structure for elements which provides for improved thermal transfer from the element due to the large area in contact with the framework of the structure.

Another object of the invention is to provide a support structure for electronic modules which has built-in radio frequency (R.F.) shielding between modules.

Other objects of the invention will become readily apparent from the following description and accompanying drawing wherein the single figure is a schematic view illustrating the invention and the removability of the elements therein.

Broadly, the invention relates to an integrated module structure achieved by placing individual module packs into cavities in a grate-like metal framework. The cavities are oversize and a siliastic bonding agent is used to hold the modules in place, thereby adding rigidity to the overall assembly and yet permitting each module to be pushed out for replacement. The module units protrude from both sides of the framework to increase their intraconnection capability.

Referring now to the drawing a framework indicated generally at 10 comprises end members 11 and 12, side members 13 and 14, and partition members 15, 16, 17 and 18. In this configuration of the invention each of the partition members are interconnected together at the center of framework 10 with members 15 and 18 connected to end members 11 and 12, respectively, while members 16 and 17 are connected to side members 13 and 14, respectively. Mounting members 19 defining gusseted angles which include the end portions of members 11 and 12 are connected to side members 13 and 14 (only shown on member 13), mounting members 19 being provided with an aperture 20 for attaching the framework 10 to a support or other desired location.

The framework 10 can be assembled, for example, by dip brazing and may be of heat treated aluminum alloy, the members 11–18 being 0.020–0.060 inch thick and 0.75–2.0 inches wide. Also, the framework can be constructed of epoxy glass laminated board and assembled, for example, by epoxy cement.

The framework 10 is designed so that the openings or cavities defined by the members thereof are approximately 0.030 inch larger than the size of modules indicated at 21, 22, 23 and 24. The modules 21–24 are held in place in the openings or cavities within framework 10 by a bonding agent indicated at 25 which is applied to the module and to the inner surface of the framework in an approximate thickness of 0.015 inch. Module 23 is shown displaced from its aperture-like area or cavity in framework 10 to illustrate the interconnection capability between modules due to the modules 21–24 protruding from both sides of the framework 10 wherein both sides of the modules may be used for interconnections.

The bonding agent 25 is preferably a silastic rubber resin such as R.T.V. 60. The bonding agent 25 may be varied in composition to achieve a strength that is sufficient to hold the modules 21–24 in place, give sufficient rigidity to the overall assembly, yet permit the module to be pushed out for replacement. The pressure required to push a module out of framework 10 is adjusted by the composition of the bonding agent to approximately 50 lbs.

When completely assembled, the structure attains a very high strength to weight ratio. The framework takes the tensile loads while the modules absorb the compressive loads, damp out vibration and prevent buckling of the thin walled framework.

It has thus been shown that the invention provides a module support structure which has the following advantages: (1) takes less space, as the entire framework fits between the modules in the same space required in conventional designs for clearance between modules; (2) eliminates the necessity for threaded inserts within the module; (3) saves weight by eliminating the heavy plate used in conventional designs for module mounting; (4) provides for increased electrical interconnection capability between modules as the modules protrude from both sides of the framework and both sides may be used for interconnections; (5) provides for improved thermal transfer from the module due to the large area in contact with the framework; and (6) provides built-in R.F. shielding between modules.

While the invention has been illustrated as utilizing a framework for four (4) modules, and the modules have been illustrated as protruding from the framework, it is not intended to limit the invention to the number of modules or the framework configuration shown and described in that these parameters would be dependent on the requirements of a specific application.

Although a specific embodiment for carrying out the invention has been illustrated and described, modifications thereof will be apparent to those skilled in the art, and it is intended to cover in the appended claims all such modifications as some within the spirit and scope of the invention.

What we claim is:

1. A module support structure comprising a framework having at least one opening therein, module means removably positioned in the opening of said framework, said module means being configured to substantially conform with the configuration of said opening, said opening of said framework having accessibility thereto such that said module means may be inserted and removed therefrom in a plurality of directions, and means bonding said module means in said opening wherein said framework provides efficient thermal transfer from the module means due to the large area of contact therebetween, said framework being constructed of material which provides radio frequency shielding for said module.

2. The module support structure defined in claim 1, wherein said framework is constructed of heat treated aluminum alloy strips having a thickness in the range of 0.020–0.060 inch and a width of 0.75–2.0 inches.

3. The module support structure defined in claim 1, wherein said bonding means is a silastic rubber resin.

4. A support structure for electronic modules comprising a framework which provides built-in radio frequency shielding between associated modules, said framework being constructed to define a plurality of openings, each of said openings having accessibility thereto from opposite sides of said framework and being configured to substantially conform with the configuration of a plurality of modules, means for bonding said modules in said framework, said openings containing associated electronic modules which are inserted and removed from opposite sides of said framework and bonded therein, said framework being constructed such that the modules extend from opposite sides thereof, whereby interconnection of the modules can be accomplished at a plurality of surfaces thereof.

5. The support structure defined in claim 4, wherein said framework comprises a plurality of interconnected metallic strips.

6. The support structure defined in claim 5, wherein said metallic strips are constructed of heat treated aluminum alloy strips having a thickness in the range of 0.020–0.060 inch and a width of 0.75–2.0 inches.

7. A support structure for electronic modules comprising a framework which provides for thermal transfer from the modules due to the large area of contact between the framework and an associated module and provides built-in radio frequency shielding between modules, said framework being constructed of a plurality of members interconnected to define a plurality of aperture-like areas extending therethrough and accessible from different directions for insertion and removal of electronic modules, an electronic module configured to cooperate with said aperture-like areas and removably held in at least a portion of said plurality of aperture-like areas by a bonding agent, side portions of said electronic modules extending from said aperture-like areas whereby increased electrical interconnection capability between modules is provided due to the accessibility to said modules from different directions and due to the extending side potrions of said modules.

8. The support structure defined in claim 7, wherein said bonding agent is a silastic rubber resin, and wherein an electronic module may be removed from the associated aperture-like area by applying sufficient pressure thereto to rupture said bonding agent.

9. The support structure defined in claim 7 additionally including means for supporting said framework.

References Cited by the Examiner

UNITED STATES PATENTS

| | | | |
|---|---|---|---|
| 2,715,518 | 8/1955 | Bickler | 165—80 |
| 2,963,577 | 12/1960 | Errichiello et al. | 250—16 |
| 3,187,226 | 5/1965 | Kates. | |
| 3,198,990 | 8/1965 | Katzin | 317—100 |
| 3,264,526 | 8/1966 | Wiggerman | 317—101 |

References Cited by the Applicant

UNITED STATES PATENTS 2,994,844 8/1961 Niederman.

ROBERT K. SCHAEFER, *Primary Examiner.*

M. GINSBURG, *Assistant Examiner.*